(12) United States Patent
Qian

(10) Patent No.: US 9,063,364 B2
(45) Date of Patent: Jun. 23, 2015

(54) PIEZO-CAPACITIVE EFFECT-BASED PRINTED FLEXIBLE TOUCHSCREEN DISPLAY

(75) Inventor: Jun Qian, Wuhan (CN)

(73) Assignee: Beijing San Wu Jiu Investment Co., Ltd. (CN)

( * ) Notice: Subject to any disclaimer, the term of this patent is extended or adjusted under 35 U.S.C. 154(b) by 61 days.

(21) Appl. No.: 14/119,555

(22) PCT Filed: Jul. 17, 2012

(86) PCT No.: PCT/CN2012/078733
§ 371 (c)(1),
(2), (4) Date: Nov. 22, 2013

(87) PCT Pub. No.: WO2013/010474
PCT Pub. Date: Jan. 24, 2013

(65) Prior Publication Data
US 2014/0078424 A1    Mar. 20, 2014

(30) Foreign Application Priority Data

Jul. 21, 2011 (CN) .......................... 2011 1 0205111

(51) Int. Cl.
| G02F 1/1335 | (2006.01) |
| G02F 1/1333 | (2006.01) |
| G06F 3/044 | (2006.01) |
| G06F 3/041 | (2006.01) |

(52) U.S. Cl.
CPC ............ *G02F 1/13338* (2013.01); *G06F 3/044* (2013.01); *G06F 2203/04103* (2013.01); *G06F 3/0412* (2013.01); *G06F 2203/04102* (2013.01)

(58) Field of Classification Search
CPC .... G02F 1/13338; G06F 3/044; G06F 3/0412
USPC ................................ 349/12, 86, 95, 106, 158
See application file for complete search history.

(56) References Cited

U.S. PATENT DOCUMENTS

2007/0165004 A1* 7/2007 Seelhammer et al. ........ 345/173
2010/0317409 A1* 12/2010 Jiang et al. .................... 455/566

FOREIGN PATENT DOCUMENTS

| CN | 101924816 A | 10/2012 | ............ H04M 1/725 |
| CN | 102236472 A | 10/2012 | .............. G06F 3/041 |
| CN | 201069505 Y | 10/2012 | ............ G02F 1/1343 |
| CN | 201707518 U | 10/2012 | ................ G02F 1/13 |
| CN | 202205176 U | 10/2012 | .............. G06F 3/041 |

* cited by examiner

*Primary Examiner* — Nathanael R Briggs
(74) *Attorney, Agent, or Firm* — Sunstein Kann Murphy & Timbers LLP

(57) ABSTRACT

A piezo-capacitive effect-based printed flexible touch screen, comprising a printable layer, a printing ink layer, a transmissive layer, an electrode layer A, an electrically-controlled optical switch layer, an electrode layer B, a transparent flexible layer, and an electrode layer C disposed successively from bottom to top. The printable layer is a flexible insular material that is foldable and printable. The printing ink layer is a CMYK ink dot matrix printed on the printable layer. The transmissive layer is a flexible transmissive material. The transparent flexible layer is a TPE-thermoplastic elastomer. The electrically-controlled optical switch layer is a PDLC film. The electrode layer A, electrode layer B, and electrode layer C are all ITO conductive film layers having electrode array engraved thereon, while the electrode arrays of the electrode layer A and the electrode layer C are in same direction and are perpendicular in direction to the electrode array of electrode layer B. The screen is a touch screen and allows for facilitated colorization, rapid response time, reduced driving voltage, simplified manufacturing method, and reduced manufacturing costs.

7 Claims, 1 Drawing Sheet

Diffuse reflection layer
Electrode layer C
Transparent elastic layer
Electrode layer B
Electrically-controlled optical switch layer
Electrode layer A
Transmissive layer
Printing ink layer
Printable layer

| Diffuse reflection layer |
|---|
| Electrode layer C |
| Transparent elastic layer |
| Electrode layer B |
| Electrically-controlled optical switch layer |
| Electrode layer A |
| Transmissive layer |
| Printing ink layer |
| Printable layer |

PIEZO-CAPACITIVE EFFECT-BASED PRINTED FLEXIBLE TOUCHSCREEN DISPLAY

FIELD OF THE INVENTION

The present invention relates to a piezo-capacitive effect-based printing flexible touchscreen pertaining to the field of printing, also pertaining to the field of electronics.

DESCRIPTION OF THE PRIOR ART

The current display technology can be divided into two categories. One of them is paper display, whose main features are described as follows: displaying content by reflecting ambient light, facilitating color display, and having large viewing angle (close to 180°) and soft medium. The other one is electronic display such as CRT, LCD, LED, etc., whose main features are described as follows: allowing information to be fast refreshed, displaying via the display's own internal light, consuming more power during work, rather fatiguing over reading, and having inflexible the medium.

Over the past decade people are focusing on the development of a paper-like reflective flexible displays (commonly known as e-paper), with an attempt to overcome the shortcomings of the aforementioned two types of display technology and retain their advantages, namely, to allow the new display have following features such as a flexible medium, fast display through electrical control, display by reflecting ambient light, low-power consuming, and portability. As far as paper-like reflective flexible display research and development is concerned, the rapid development has been made by E-Ink, Philips, IBM, Bell Labs and other international companies on electrophoresis, and the display principle thereof is based on different colors (basically white and black at present) charged ball (placed in the microcapsules or cup), the electrophoretic mobility sight of different colors (basically white and black at present) charged ball (placed in the microcapsules or cup) of different colors (basically white and black at present) under the electric field on the external reflection of ambient light present two completely different colors.

Some progress has been made on electrophoresis-based flexible display, but there are still a series of problems such as: slow response (hundreds of milliseconds), difficulties to achieve color (use of different filters to achieve color), high production cost, which need to be solved.

SUMMARY OF THE INVENTION

The objective of the present invention is to overcome the defects of prior art and to provide a piezo-capacitive effect-based printing flexible touch screen, which forms the color vision by the reflected light and has advantages such as touch function, easy colorization, fast response, low driving voltage, simple manufacturing process and low-cost.

To achieve the above objective, the technical solution adopted by the present invention is described as follows:

A piezo-capacitive effect-based printing flexible touch screen includes a printable layer and a printing ink layer attached on the printable layer, and at least a transmissive layer, an electrode layer A, an electrically-controlled optical switch layer, an electrode layer B, a transparent elastic layer and an electrode layer C are attached on the printing ink layer from bottom to top. The printable layer is a flexible insulating material that is foldable and printable. The printing ink layer is a CMYK color ink dot matrix printed with ink on the printable layer. The transmissive layer is a flexible transmissive material. The electrically-controlled optical switching layer is a polymer-dispersed liquid crystal film. The transparent elastic layer is a TPE-thermoplastic elastomer with a transmissive rate more than 90%, a Shore hardness below 10 A, a tensile strength more than 1 MPa. The Electrode layer A, electrode layer B, and electrode layer C are all ITO conductive film layers having electrode array engraved thereon, while the electrode arrays of the electrode layer A and the electrode layer C are in same direction and are perpendicular in direction to the electrode array of electrode layer B.

The diffuse reflection layer is attached on said electrode layer C. The diffuse reflection layer is a matt film or varnish having a diffuse reflection function.

An underlayer attached on the transmissive layer is disposed between the transmissive layer and the electrode layer A, the electrode layer A is attached on the underlayer, and the underlayer is an ETEE plastic film or PET plastic film.

The transmissive layer is an ETEE plastic film, a PET plastic film or UV adhesive.

The transparent elastic layer is preferably polyurethane; the transparent elastic layer has a thickness in the range of 20 to 100 μm.

The thickness of the display is no more than 5 mm.

The advantages of the present invention compared with the prior art are described as follows:

1. The present invention provides a display adopting printing ink technology as a basis for the black-and-white and color display, using the mature FM screening printing technology to achieve higher resolution to improve the accuracy of the output. Due to the color vision mixing principle in printing, a variety of colors are obtained by superimposing the reflected light of printed dot matrix. The color display solution technology is relatively mature and the method is simple and effective, and the display is more colorful.

2. The present invention provides a screen using the polymer-dispersed liquid crystal (PDLC) film as the electrically-controlled optical switch, the response time thereof may be shortened to 40 ms, the driving voltage may be reduced to 25V, which is significantly better than the current mainstream E-INK technology (whose response time is about 150 ms, and the driving voltage is about 90V). In addition, PDLC film does not need a polarizer, it exists in the form of a solid film and preparation process thereof is easy to implement, which is suitable for roll-to-roll continuous processing, so that the production process is simple with low production cost, and it is suitable for mass production. Whereas a display using an electro-optic crystal as the electrically-controlled optical switch needs relatively high driving voltage (about 443V), and the preparation process of the solid-state membrane is complex with high cost, although the response time is short. In contrast, the screen provided in the present invention is remarkably advantageous in the aspects of the driving voltage, the production process and the production cost.

3. The current screen adopting the TFT substrate as an electrode is not only structurally complex, highly costly, but also is mainly applied to the transmissive working way with backlight source, because the TFT substrate is a film transistor. The screen of the present invention uses the ITO conductive film as a control electrode, so that it has a more simple structure and low cost, and it achieves the display by the reflection of the natural light, and does not require special light source, which is in line with the human eye reading habits. In addition, by using the matt film or varnish with diffuse reflection function as the diffuse reflection layer, the glare can be eliminated, which would improve the contrast and reading comfort.

4. The display provided by the present invention is provided with a capacitor matrix consisting of an electrode layer B, a transparent elastic layer and an electrode layer C. When the screen is touched, the transparent elastic layer deforms under external force, changing the spacing between the electrode layer B and the electrode layer C, so that the value of the capacitor consisting of the electrode layer B, the transparent elastic layer and the electrode layer C changes at the touch point, thereby sensing the external touch to actualize the touch screen function.

5. Each layer of the present invention is made to be a film, such that the display has a thickness no more than 5 mm, so that the display is lightweight, which makes it easy for flexibility.

BRIEF DESCRIPTION OF THE DRAWINGS

FIG. 1 is a structural schematic diagram of the piezo-capacitive effect-based printing flexible touch screen provided by Example 1.

DETAILED DESCRIPTION OF THE PREFERRED EMBODIMENTS

The present invention is further illustrated by the following specific embodiments, but the protecting scope of the present invention is not limited to the following Examples.

Example 1

As shown in FIG. 1, the bottom layer of the screen provided by the present embodiment is a printable layer, and a printing ink layer is attached on the printable layer. A transmissive layer, an electrode layer A, an electrically-controlled optical switch layer, an electrode layer B, a transparent flexible layer, and an electrode layer C and a diffuse reflection layer are attached on the printing ink layer successively from bottom to top. The thickness of the screen is no more than 5 mm.

The printable layer uses a flexible insulating material that is foldable and printable, such as paper, plastic, cloth, and so on. Ink is printed on the printable layer to produce color CMYK ink dot matrix to obtain the printing ink layer.

The transmissive layer uses highly transmissive flexible material, such as ETEE (ETEE is a copolymer of tetrafluoroethylene and ethylene) plastic film, PET plastic film or UV adhesive which are used to increase the distance between the printing ink layer and an electrically-controlled optical switch layer, to ensure that the printing ink layer is completely covered to be opaque in an unpowered state.

The electrode layer A, the electrode layer B and the electrode layer C are all ITO conductive film layers engraved with the electrode array. When the transmissive layer is UV adhesive, an underlayer is additionally provided between the transmissive layer and the electrode layer A and attached on the transmissive layer, and the ITO conductive film used as an electrode layer A is attached on the underlayer which is ETEE or PET plastic film. When the transmissive layer is ETEE or PET plastic film, the ITO conductive film used as an electrode layer A is directly attached on the transmissive layer. The transmissive layer of the present embodiment is ETEE or PET, and the electrode layer A is attached on the transmissive layer. The ITO conductive film used as the electrode layer B is attached on the ITO coating layer of the electrically-controlled optical switch layer. The ITO conductive film used as an electrode layer C is an ITO coating layer attached on the transparent elastic layer. The electrode arrays of electrode layer A and the electrode layer C are in same direction and are perpendicular in direction to the electrode array of electrode layer B. In the present embodiment the electrode arrays of the electrode layer A and the electrode layer C are of the X-axis direction, and the electrode array of the electrode layer B is of the Y-axis direction.

The electrically-controlled optical switch layer uses a polymer-dispersed liquid crystal (PDLC) film, and this layer is used as a display control switch of the screen to achieve color display by controlling the CMYK color ink dot matrix on the printing ink layer. Generally speaking, the thicker the electrically-controlled optical switching layer is, the higher the contrast is.

The transparent elastic layer is made by a TPE-thermoplastic elastomer with a transmissive rate more than 90%, a Shore hardness below 10 A, a tensile strength more than 1 MPa and a thickness of 20 μm to 100 μm, such as polyurethane. This layer plays a supporting role, and separates the electrode layer B and the electrode layer C. The electrode layer B, the transparent elastic layer and the electrode layer C compose a capacitor matrix. When the screen is touched, the transparent elastic layer deforms under external force, changing the spacing between the electrode layer B and the electrode layer C, so that the value of the capacitor consisting of the electrode layer B, the transparent elastic layer and the electrode layer C changes at the touch point, thereby sensing the external touch to actualize the touchscreen function.

The diffuse layer uses a matt film or a varnish with diffuse reflection function, and this layer is used to eliminate glare and improve the readability of the display.

Example 2

The bottom layer of the screen in the present embodiment is a printable layer, and a printing ink layer is attached on the printable layer. A transmissive layer, an underlayer, an electrode layer A, an electrically-controlled optical switch layer, an electrode layer B, a transparent flexible layer, and an electrode layer C are attached on the printing ink layer successively from bottom to top. The thickness of the screen is no more than 5 mm. The transmissive layer is UV adhesive in the present embodiments, materials of the other layers are the same as that in Example 1.

The method for preparing the piezo-capacitive effect-based printed flexible touchscreen of the present invention is described as follows:

(1) Ink is printed on the printable layer using gravure to produce color CMYK ink dot matrix and to obtain a printable layer attached with a printing ink layer. The process thereof is described as follows: preparing the flexible substrate→mounting plate→adjusting alignment→formally printing→processing after printing. The gravure printing machine is of high automation, with good quality of plate making and simple operation.

(2) The printable layer is coated with flexible transmissive material such as ETEE, PET plastic film or UV glue, to obtain the transmissive layer.

(3) When the transmissive layer is an ETEE or PET plastic film, a transparent indium tin oxide coating layer is sputtered on the transmissive layer to obtain ITO conductive film. When the transmissive layer is UV adhesive, a ETEE or PET plastic film is covered on the UV adhesive to be used as the underlayer, and a transparent indium tin oxide coating layer is sputtered on the underlayer to the obtain ITO conductive film; A five-mask process is adopted, namely, a mask pattern, is used to complete processing of electrode array on the prepared ITO electroconductive film to obtain the electrode layer A through multiple same pattern transfer process. The pattern transfer process for the electrode array is composed of steps of lithography, exposure, etching, cleaning and detection, etc.

(4) A polymerization phase separation method is adopted to prepare PDLC, and the PDLC is applied to the electrode layer A. Light (UV) curing method is used to cure it to obtain the electrically-controlled optical switch layer. This process is simple and easy to control, and it also has advantages such as fast curing, minor toxic, etc.

(5) A transparent indium tin oxide coating layer is sputtered on the electrically-controlled optical switch layer to obtain the ITO conductive film, and then the method the same with the method for processing the electrode array in the electrode layer A is used to process out electrode array on the ITO conductive film, and to obtain the electrode layer B by making the angle between the direction of the electrode array thereof and the direction of the electrode array of the electrode layer A to be 90°. For example, the electrode array of the electrode layer A is along the X-axis direction, and the electrode array of the electrode layer B is along the Y axis direction.

(6) The injection molding process is used on the electrode layer B to process out TPE-thermoplastic elastomer to obtain a transparent elastic layer.

(7) A transparent indium tin oxide coating layer is sputtered on the transparent elastic layer to obtain the ITO conductive film, and the electrode array on the ITO conductive film is processed. The electrode array is arranged in the direction same as the direction of the electrode array of the electrode layer A, and electrode layer C is obtained by making the angle between the direction of the electrode array thereof and the direction of the electrode array of the electrode layer B to be 90°.

(8) A matt film or varnish having a diffuse reflection function is used as the diffuse reflection layer. When the matt film is used, an insulating transparent adhesive such as UV adhesive is used to glue the matt film on the electrode layer C to obtain a diffuse reflection layer; when a varnish having the diffuse reflection function is used, the varnish is directly applied on the electrode layer C, and then light (UV) curing is performed to obtain a diffuse reflection layer; finally, it is sealed with a sealing gum.

The display principle of the piezo-capacitive effect-based printed flexible touch screen of the present invention is described as follows:

The electrically-controlled optical switch layer uses PDLC, which is obtained according to the following process. Low molecular weight liquid crystal is mixed with the prepolymer to form micron-sized liquid crystal droplets uniformly dispersed in the polymer network under certain conditions by the polymerization reaction, and the material having an electro-optical response characteristic is obtained by using dielectric anisotropy of the liquid crystal molecules. It mainly works between a scattering state and a transparent state, and has a certain gray level. In the unpowered state, it has a diffuse reflection characteristic per se, in milky white, and it becomes transparent in power-on state. Electrically-controlled optical switch layer controls CMYK color ink dot matrix to actualize color display, and then color printing ink layer is formed. When the electrically-controlled optical switch layer is powered under an appropriate voltage, the film becomes transparent and displays the color of the printing ink layer, due to the orientation of the liquid crystal molecules. A blank area for the non-image area is not applied with voltage, and the liquid crystal molecules in the electrically-controlled optical switch layer become disorderly, and the film has certain opacity as the color of white is displayed.

What is claimed is:

1. A piezo-capacitive effect-based printing flexible touch screen display, comprising a printable layer and a printing ink layer attached on the printable layer, wherein at least a transmissive layer, an electrode layer A, an electrically-controlled optical switch layer, an electrode layer B, a transparent elastic layer and an electrode layer C are attached on the printing ink layer successively from bottom to top, the printable layer is a flexible insulating material that is foldable and printable, the printing ink layer is a CMYK color ink dot matrix printed with ink on the printable layer, the transmissive layer is a flexible transmissive material, the electrically-controlled optical switching layer is a polymer-dispersed liquid crystal film, the transparent elastic layer is a TPE-thermoplastic elastomer with a transmissive rate more than 90%, a Shore hardness below 10 A, a tensile strength more than 1 MPa, the electrode layer A, electrode layer B, and electrode layer C are all ITO conductive film layers having electrode array engraved thereon, while the electrode arrays of the electrode layer A and the electrode layer C are in same direction and are perpendicular in direction to the electrode array of the electrode layer B.

2. The piezo-capacitive effect-based printing flexible touch screen display according to claim 1, wherein a diffuse reflection layer is attached on the electrode layer C, and the diffuse reflection layer is a matt film or varnish having a diffuse reflection function.

3. The piezo-capacitive effect-based printing flexible touch screen display according to claim 1, wherein an underlayer attached on the transmissive layer is disposed between the transmissive layer and the electrode layer A, the electrode layer A is attached on the underlayer, and the underlayer is an ETEE plastic film or a PET plastic film.

4. The piezo-capacitive effect-based printing flexible touch screen display according to claim 1, wherein the transmissive layer is an ETEE plastic film, a PET plastic film or a UV adhesive.

5. The piezo-capacitive effect-based printing flexible touch screen display according to claim 1, wherein the transparent elastic layer is polyurethane.

6. The piezo-capacitive effect-based printing flexible touch screen display according to claim 1 or 5, wherein the transparent elastic layer has a thickness in the range of 20 to 100 µm.

7. The piezo-capacitive effect-based printing flexible touch screen display according to claim 1, wherein the thickness of the display is no more than 5 mm.

* * * * *